United States Patent [19]

Smith et al.

[11] Patent Number: 5,149,050

[45] Date of Patent: Sep. 22, 1992

[54] MACHINERY BASE PAD

[76] Inventors: Derrell Smith, P.O. Box 6772, Moore, Okla. 73160; Aladino Cassar, 2449 Glenn Ave., Del City, Okla. 73115

[21] Appl. No.: 640,850

[22] Filed: Jan. 14, 1991

[51] Int. Cl.$^5$ ............................................. F16M 5/00
[52] U.S. Cl. .................................... 248/679; 248/680
[58] Field of Search ............... 248/675, 676, 678, 680, 248/346, 500

[56] References Cited

U.S. PATENT DOCUMENTS

| | | | |
|---|---|---|---|
| 1,666,149 | 4/1928 | Rosenzweig | 248/679 |
| 3,190,041 | 6/1965 | Kimball | 248/679 |
| 3,334,850 | 8/1967 | Jackson | 248/679 |
| 4,700,923 | 10/1987 | Lewis | 248/679 |

FOREIGN PATENT DOCUMENTS 380351 10/1964 France ................................ 248/679

Primary Examiner—Carl D. Friedman
Assistant Examiner—Derek J. Berger
Attorney, Agent, or Firm—Laney, Dougherty, Hessin & Beavers

[57] ABSTRACT

A base pad for supporting heavy, vibrating machinery with minimal environmental pollution, the pad including a peripheral frame of rigid beams, a grid of reenforcing rods extending across the interior of the peripheral frame between the beams, and a cementitious filler within the peripheral frame. Flanged channel beams extend across the peripheral frame in spaced pairs and form a series of spaced anchor slots opening upwardly through the cementitious material, and also form liquid drains beneath the slots. The drains communicate through openings through the beams with aligned discharge spouts secured to the beams. A plurality of intercommunicating, peripheral, unwardly opening V-gutters are disposed in the cementitious filler adjacent the peripheral frame beams, and are connected to drain liquid into the liquid drains.

5 Claims, 2 Drawing Sheets

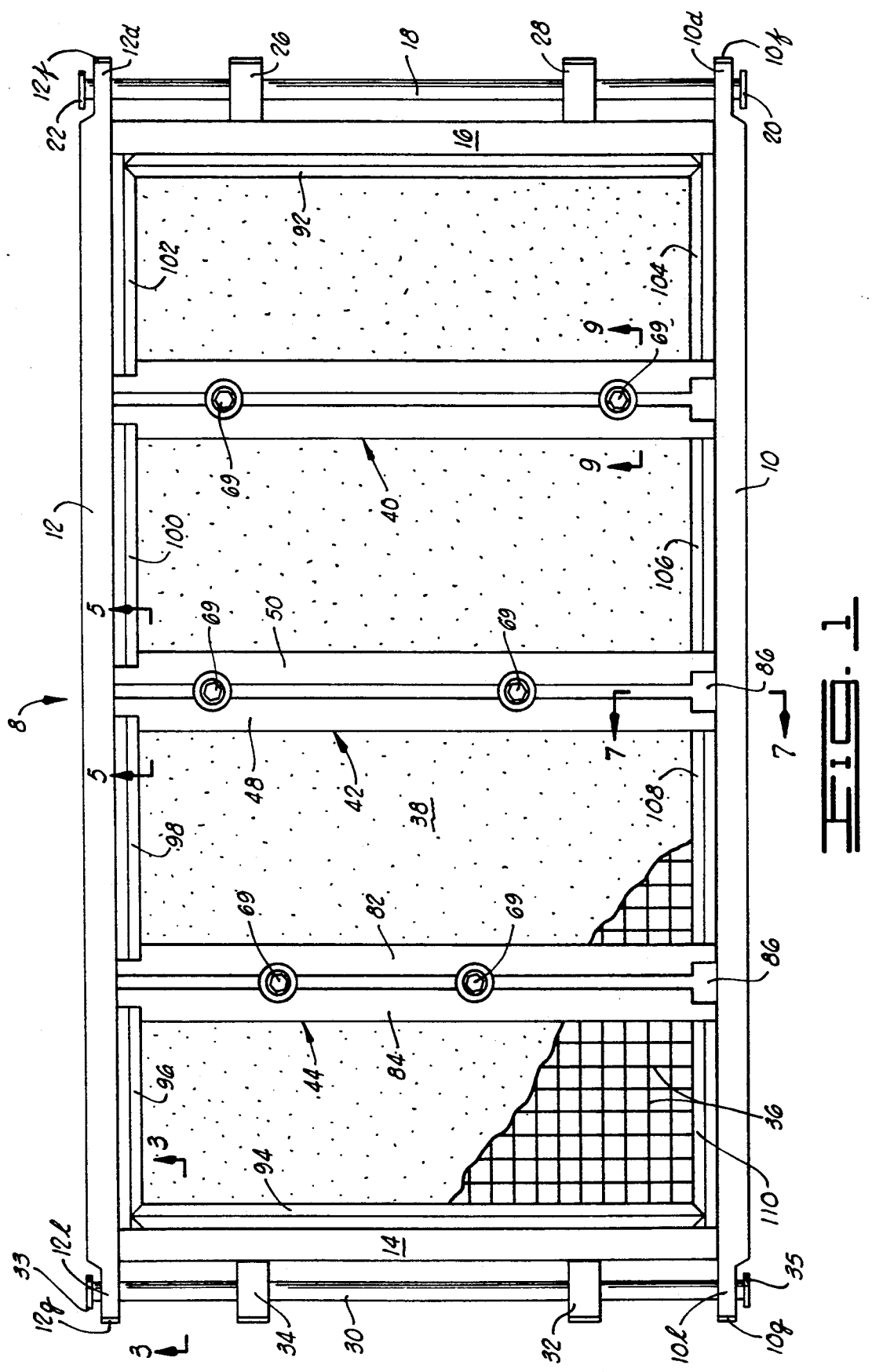

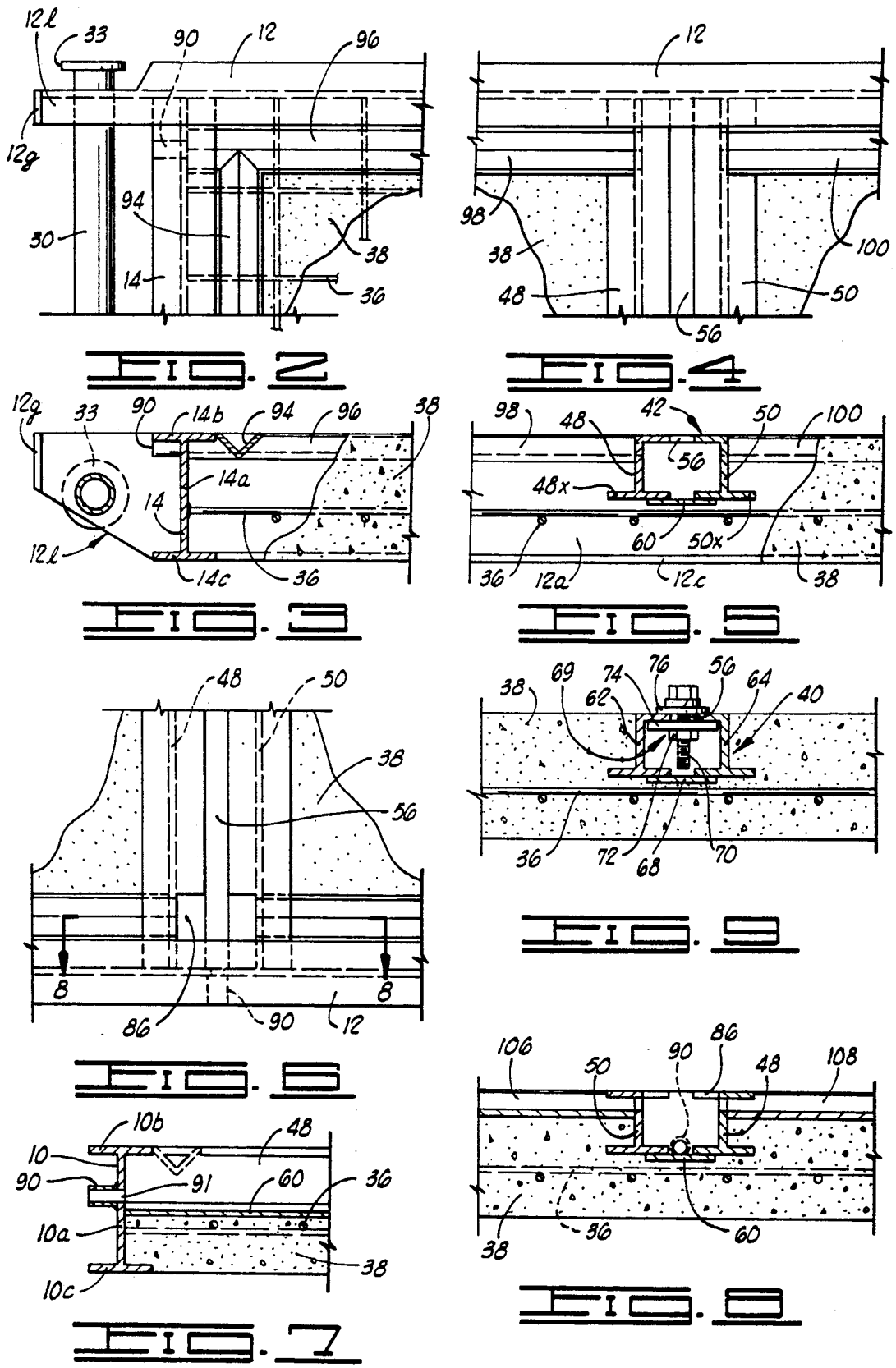

MACHINERY BASE PAD

FIELD OF THE INVENTION

This invention relates to a machinery base pad which is constructed to support severely vibrating heavy machinery, and which requires lubrication oil and grease, and perhaps circulates other environmentally deleterious fluids during operation, with the pad construction affording protection against waste liquid contamination of the environs.

BACKGROUND OF THE INVENTION

Brief Description Of The Development Of The Invention

With certain types of heavy machinery, such as large compressors, it is necessary to anchor the machinery to a stationary base because the high amplitude cyclical vibration of the machinery will cause the machinery to "walk" or undesirably move away from its initial point of support as the machinery is operated. This displacement of the machine as a result of vibration can cause interconnecting piping, electrical wiring and the like to be stressed, and may even cause structural failure of such connections with the result that the system is damaged, and the machine ceases to operate. Moreover, in the case of severe vibration, the distance which a heavy machine may move can be great enough over an extended period of operation without close attendance that damage to surrounding machinery or valuable pieces of equipment can result from the impact of the "walking" machine.

Where a machine of the type described has been bolted or otherwise secured to a supporting surface or pad, the necessity can arise from time-to-time for detaching the machine from the supporting surface or pad in order to move it to a different location. The permanency of the anchoring system used can then be a deterrent to rapid and economical removal of the machinery to transport it to the new location. Moreover, the pads or supporting structures employed are frequently permanently fixed at the location where they are used to support the machine, with the result that a new pad must be constructed at the new operational situs of the machine. This is costly.

One of the concomitant characteristics of severely vibrating machinery is the propensity of such machinery to vibrate lubricant or circulated liquids out of the machine and on to the supporting pad or other structure upon which the machine rest during its operation. Thus, oil, grease and other lubricants which may be employed tend to be splashed or vibrated out of reservoirs, or through various seals in the machinery, so that a significant pool or accumulation of such hydrocarbon lubricant compositions tend to locate beneath the machine, and to each side thereof for some distance.

These environmentally harmful substances may then move by gravity or vibratory response outwardly from the machine into the surrounding soil. The soil adjacent the pad or other supporting structure may thus be poisoned or contaminated. These deleterious materials present the further hazard of migrating with percolating water downwardly into a subterranean water table, with resulting contamination of water supplies. Although heavy machinery has been operated for many years without great concern for this source of environmental contamination, the heightened sensitivity of environmentalists, hydrologists, and governmental agencies to the hazards posed by even relatively small amounts of hydrocarbon contamination, such as that originating at an industrial source, makes it desirable that some means be provided for preventing the lubricants or other fluids which may leak from the machinery from being dispersed into the surrounding soil, or, when the machine is enclosed within a building, to a location where the grease or other contaminate may be washed down during clean up and into drains which ultimately drain to storm sewers or other potential sources of subsoil contamination.

BRIEF DESCRIPTION OF THE PRIOR ART

Most of the pads which have been previously provided for supporting intensely vibrating heavy machinery of the type described, including, for example, very large compressors, have been permanent structures, and are not generally moved from one location to another for any reason, including that of changing the position of the machinery, or installation of the machinery at a different factory location.

BRIEF DESCRIPTION OF THE PRESENT INVENTION

The present invention is a base pad for supporting and anchoring heavy vibrating machinery in a way which minimizes environmental pollution from the effluents and fluids leaked from the machine during its operation. This base pad is a heavy structure preferably made of concrete and steel, and includes a peripheral frame made of rigid interconnected beams, such as C-channels or I-beams. A grid of reenforcing rods or rebar extends across the interior of the peripheral frame between the beams and is spaced upwardly from a plane in which the bottoms of the beams are commonly located. The tops of the beams are also in a common plane which preferably extends substantially parallel to the plane in which the bottoms of the several beams in the peripheral frame are commonly located.

A cementitious filler material such as concrete is positioned within the frame and extends between the peripheral beams. Spaced, flanged channel beams extend in spaced pairs across the peripheral frame and are embedded in the cementitious filler material. The flanged channel beams are paired so as to form a series of spaced, elongated anchor slots which are used in conjunction with fastening subassemblies to detachably retain the machinery in a fixed or anchored position on the upper side of the pad. Each pair of beams also forms a liquid drain in vertical alignment with the anchor slot. Each drain communicates through a liquid passageway opened through the beam with an aligned discharge spout secured to the outer side of the frame beams. A plurality of intercommunicating, peripheral, upwardly opening V-gutters are disposed in the cementitious filler adjacent the peripheral frame, and communicate with the liquid drains to drain any liquid which enters the V-gutters from the upper side of the pad into the liquid drains, and ultimately out through the discharge spouts.

Suitable towing or lifting bars are attached to the peripheral frame at opposite ends thereof so as to permit the base pad to be pulled to a new location by sliding, or to be lifted up with a crane so that it can be trucked to a new location.

An important object of the invention is to provide a base pad for supporting heavy vibratory machinery, such as a compressor, and for collecting and retaining until removed, environmentally deleterious liquids, such as grease and oil, which drain from, or are vibrated out of, the machinery during its operation.

A further object of the invention is to provide a heavy base pad upon which vibrating machinery can be mounted to prevent it from walking or jumping across a floor, or other supporting structure, from its original location, but which can be transported from one position, in which it functions to anchor such machinery, to a new location where it can be used to anchor the same or different machinery.

Another object of the invention is to provide a structurally strong portable supporting base pad for supporting a heavy compressor or other machinery, which base pad is characterized in having a long and trouble free operating life, and which is susceptible to detachable anchoring of the machinery thereto in a way which facilitates quick detachment and release of the machinery should it be desirable to remove it from the pad.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 1 is a plan view of a base pad for a compressor or other heavy machine constructed in accordance with the present invention, and showing a part of the base pad broken away in order to better illustrate the reenforcing grid used in its construction.

FIG. 2 is an enlarged plan view of one corner of the base pad of the invention, illustrating certain reenforcing rods or bars which are used in the construction of the pad, and one of the drain pipes or spouts which is located in the illustrated portion of the pad.

FIG. 3 is a sectional view taken along line 3—3 of FIG. 1 at a location adjacent the corner of the pad shown in elevation in FIG. 2.

FIG. 4 is an enlarged detail view of a pair of the flanged channel beams used to form a transverse liquid drain in the compressor pad, and to form an anchor slot which extends transversely across the pad and is vertically aligned with the liquid drain. This drawing also illustrates a pair of V-trough elements which communicate with, and convey liquid to, the transverse liquid drain.

FIG. 5 is a sectional view taken along line 5—5 of FIG. 1, and corresponding in its location on the pad to the plan view detail shown in FIG. 4.

FIG. 6 is an enlarged plan view of a structural detail, and functions to illustrate the manner in which a pair of the flanged channel beams are used, at one end, to communicate liquid moving in the liquid drain through the peripheral frame of the pad to a discharge spout or pipe located on the outer side of the peripheral frame of the pad.

FIG. 7 is a sectional view taken along line 7—7 on FIG. 1, and corresponding in its location on the pad to the plan view detail shown, in FIG. 6.

FIG. 8 is a sectional view taken along line 8—8 on FIG. 6.

FIG. 9 is a sectional view taken along line 9—9 on FIG. 1.

DETAILED DESCRIPTION OF A PREFERRED EMBODIMENT OF THE INVENTION

Although the base pad of the invention can be variously shaped in its overall configuration, it will generally have a flat bottom and a flat top to adapt it to be rested upon a flat stretch of ground or the like, and to support a relatively large machine having a supporting base stand adapted to be stably rested on, or against, a flat, upwardly facing surface. The overall outer peripheral configuration of the pad may be polygonal or even round, but is preferably rectangular, and a rectangular embodiment of the base pad is illustrated in the accompanying drawings.

The base pad thus includes a peripheral frame 8 of interconnected rigid beams which define between them an interior of the pad. In the illustrated embodiment of the invention, the rigid beams utilized in the rectangular peripheral frame are I-beams. These include a pair of opposed, substantially parallel lateral or side I-beams, designated generally by reference numerals 10 and 12. The lateral side beams in the peripheral frame are interconnected at their opposite ends by pair of transverse I-beams 14 and 16 which also form a part of the peripheral frame. The cross-sectional configuration of one of the I-beams and its relation to certain other structure may be perceived in FIG. 3, where a section is taken through the I-beam 14 along the line 3—3 depicted in FIG. 1.

For convenience of reference, each of the I-beams used in the rectangular peripheral frame will be described as having a web portion, a top flange and a bottom flange, with these being denominated, respectively, by the suffixes "a", "b" and "c" added to the numeral by which the respective I-beam is indicated. Thus, in FIG. 3, the I-beam 14 includes a vertically extending web portion 14a, a top flange 14b and a bottom flange 14c. In the same way, the I-beam 10 which is illustrated in section in the FIG. 7 section, taken along the line 7—7 in FIG. 1, includes a web portion 10a, a top flange 10b and a bottom flange 10c. The other I-beams 10 and 16 also included in the peripheral frame are constructed identically in cross-sectional configuration to the I-beams 12 and 14 as described.

It will be noted in referring to FIG. 1 that each of the parallel side I-beams 10 and 12 located at opposite sides of the peripheral frame includes forwardly and rearwardly extending noses. Thus, the I-beam 12 includes a forwardly extending towing nose 12d and a rearwardly extending towing nose 12e. Similarly, the I-beam 10 includes a forwardly extending nose 10d and a rearwardly extending nose 10e. The noses carried at the forward ends and rear ends of the I-beams 10 and 12 are formed by cutting away the outer half of the upper flange, and the outer half of the lower flange of each of the I-beams so that the respective webs 10a and 12a are fully exposed on one side. The forward and rear ends of the beams 10 and 12 are boxed or closed at the forward and rear end of the projecting noses by closure plates, with these being denominated generally by reference numerals 10f and 10g, and 12f and 12g, respectively. The construction of the projecting towing noses on the two I-beams 10 and 12 is best illustrated in FIGS. 1, 2 and 3.

To further facilitate the transport by sliding or lifting of the base pad, a forward towing bar 18 extends transversely across the forward end of the base pad and is spaced from the peripheral frame 8 in the manner illustrated. The opposite ends of the forward towing bar 18 are passed through close fitting openings formed through the web portions 10a and 12a of the I-beams 10 and 12. Circular end plates 20 and 22 are provided on the opposite ends of the forward towing bar. A pair of transversely spaced, forwardly extending supporting beams 26 and 28 are welded to the I-beam 16 and project forwardly from the forward portion of the peripheral frame of the pad. The beams 26 and 28 also receive the forward towing bar 18 through a pair of aligned holes or openings formed through these beams.

Similarly, a rear towing bar 30 is spaced rearwardly from the rear end of the base pad and has its opposite ends extended through openings in the web portions 10a and 12a of the parallel side beams 10 and 12. This rear towing bar 30 is further supported by a pair of rearwardly projecting beams 32 and 34 as shown in FIG. 1. A pair of circular end plates 33 and 35 are secured to opposite ends of the rear towing bar as shown in FIGS. 1 and 3.

In order to reenforce the concrete, or other cementitious material which is placed within the peripheral frame, a grid of reenforcing rods or bars 36 is placed within the peripheral frame so as to extend to all of the sides of the frame formed by the four I-beams 10, 12, 14 and 16. A part of this grid made up of the reenforcing bars 36 is illustrated in FIG. 1. It will be noted as reference is made to FIGS. 3-9 that the reenforcing bars or rods in the grid are located generally in a common plane —that is, the reenforcing rod grid is substantially flat or monoplanar in configuration. It will be further noted from FIGS. 3 and 7 that the grid is located about one-third of the way from the bottom of the pad, which is coplanar with the lower surfaces of the I-beams 10, 12, 14 and 16, and the upper surface of the pad, which is substantially coplanar with the upper flanges 10b, 12b, 14b and 16b of the several I-beams making up the peripheral frame.

After the reenforcing grid has been positioned in the manner shown by welding, or otherwise suitably securing the end portions of the reenforcing rods or bars, to the inwardly facing sides of the webs of the several I-beams, the interior space defined inside the peripheral frame by the interconnected I-beams is filled with a settable cementitious material 38, preferably concrete since this will impart great weight to the base pad and better withstand the intense vibration during the service life of the pad.

Prior to the time when the concrete is poured into the space defined within the peripheral frame, several pairs of transversely extending beams are extended across the frame between the parallel side beams 10 and 12 and substantially normal thereto. Thus, in the illustrated embodiment of the invention, three pairs of such beams are substantially equidistantly spaced from each other, and from the opposite ends of the base pad as best shown in FIG. 1. The three beam pairs so utilized are there denominated generally by reference numerals 40, 42 and 44. The types of beam employed in the illustrated embodiment are flanged channel beams.

The cross-sectional configuration of the channel beam pairs is illustrated in FIGS. 5 and 9. If reference be made to FIG. 5, the channel beam pair 42 there shown includes a pair of channel beams 48 and 50. The channel beams 48 and 50 are arranged relative to each other in identical fashion to the arrangement of two channel beams in each of the channel beam pairs 40 and 44. Each of the beams 48 and 50 includes, in addition to the regular C-shaped channel characteristic a channel beam, a horizontally and outwardly extending lower flange. Thus, the channel beam 48 has a flange 48X, and the channel beam 50 has a horizontally extending flange 50X.

The two channel beams 48 and 50 are parallel and are spaced from each other to provide an upwardly opening tie down track or channel 56 at the upper side thereof. The channel beams are interconnected by a closure plate or bottom plate 60. The arrangement is such that the upwardly opening tie down track 56 can accommodate tie down bolts and nuts of the type shown in FIG. 9 and hereinafter described, as such are used for anchoring machinery supported on the pad. Moreover, the extension across the two channel beams of the bottom closure plate 60 which extends from one end of these beams to the other, forms a liquid channel which extends from one end of each beam pair to the other by way of which liquid may gravitate from one side of the pad to the other.

It should be apparent from the foregoing description, and will be further understood as the ensuing description proceeds, that instead of a pair of oppositely facing flanged channel beams, spaced from each other as shown in FIGS. 5 and 9, a pair of I-beams could also be employed, provided the flanges of such beams are spaced in the same way, and that the space between the two bottom flanges is closed by a closure plate, such as the closure plate 60, in order to provide a liquid channel.

Similar pairs of flanged channel beams characterize the beam pairs 40 and 44. Thus, in the flanged channel beam pair 40, illustrated in cross-sectional configuration in FIG. 9, channel beams 62 and 64 are spaced to provide a tie down track opening 66. The bottom flanges of the channel beams 62 and 64 are bridged by a closure plate 68 which completes the formation of the liquid channel lying directly beneath the tie down track opening 66.

The manner in which the tie down track is used in anchoring machinery to the pad is illustrated in FIGS. 1 and 9. A plurality of tie down fastener subassemblies 69 of the type there shown is provided and each fastener subassembly includes a threaded bolt 70 having the threaded shank thereof extended downwardly through the tie down track opening 66. A nut 72 is threaded on the shank of the bolt 70 and retains a large washer 74 in the illustrated position in which it bears against the underside of the upper flanges of the channel beams 62 and 64. In similar fashion, the head of the bolt 70 bears against a washer 76 which is sufficiently large to bridge across the tie down track opening 56. A plurality of the described tie down fastener subassemblies 69 are used and facilitate the extension of the threaded bolt 70 through holes formed in the foot flanges, or other suitable parts, of machinery rested upon the pad, and to be anchored to the pad in order to prevent movement due to vibratory motion during operation of the machine. Six of such fastener subassemblies are illustrated in FIG. 1, and would, of course, provide six points of securement of a machine to the upper side of the pad.

In the case of the flanged channel beam pair 44, the beam pair consists of a pair of horizontally spaced, flanged channel beams 82 and 84. It will be noted from figures of the drawings that the upper flanges of the all channel beams extend horizontally and are flush with the upper surface of the concrete 38 utilized in the pad. It will also be noted in referring to FIG. 1 that the top flange of each channel beam is cut away or notched at one end thereof, as shown in FIG. 1 at 86. The notches 86 assure that the fastener subassemblies 69 can be placed in position by pre-setting the nut 72 and washer 74 prior to sliding the fastener subassembly into the position which each occupies, with respect to its respective channel beam pair as shown in FIG. 9.

It will be noted in referring to FIGS. 1, 6 and 7 that each of the transversely extending channel beams in the channel beam pairs 40, 42 and 44 terminates in contact with the side beam 10, and that each liquid drainage channel formed thereby communicates with a spout or tubular member 90 through a hole or opening 91 in the web 10a of the beam 10. Liquid which gravitates transversely across the pad in the liquid drainage channels formed by the beam pairs 40, 42 and 44 can therefore be piped away from the pad by connection of suitable tubes and a pumping system operating through a manifold connected to each of the spouts 90.

A plurality of V-shaped troughs are employed in the construction of the base pad and are embedded in the concrete so as to open upwardly at the surface of the concrete. The V-shaped troughs are distributed around the perimeter of the frame 8 and function to collect liquids, such as grease and viscous oils, which may fall from machinery supported on the base pad. Such liquids tend to vibrate outwardly from the center of the pad toward the periphery thereof as a result of the intense vibration which is transferred to the pad from the machine during its operation.

The V-shaped troughs utilized in the illustrated embodiment of the invention include a pair of transversely extending troughs 92 and 94 at opposite ends of the pad, and a plurality of relatively short, spaced V-shaped troughs located along the opposite sides of the pad and denominated by reference numerals 96-110. Each relatively short V-shaped trough along one of the sides of the frame communicates via at least one of its ends with one of the liquid drainage channels formed between one of the pairs of transversely extending channel beams in the manner hereinbefore described. Thus, it will be perceived from the sectional view of FIG. 8 that one end of each of two short V-shaped troughs 106 and 108 communicates with the liquid drainage channel formed between the channel beams 48 and 50 in the channel beam pair 42.

At one end of the pad, the V-shaped trough 96 has one end which intersects and communicates with the transversely extending V-shaped trough 94, and thus can drain outwardly through the spout 90 shown in FIG. 3 in the manner hereinbefore described. The two short sections of V-shaped troughs 96 and 108 interconnect with the transversely extending V-shaped trough 94. In the final instance, all of the liquids which fall to the top of the pad from time-to-time will gravitate or will be washed down into the V-shaped troughs or the liquid drainage channels, and will ultimately travel into one or more of the spouts 90.

It will be perceived from the description of the preferred that a heavy, improved base pad is provided by the present invention and that that base pad affords drainage of deleterious liquids to a collection location alongside the pad, rather than permitting these liquids to vibrate out onto the ground and contaminate the soil and subterranean aquifers.

Although a preferred embodiment of the invention has been herein described in order to afford an explanation adequate to enable those having ordinary skill in the art to practice the invention, it will be understood that various changes and modifications can be made in the illustrated and described structure without departure from the basic principles which underlie the invention. Changes of that type are therefore deemed to be circumscribed by the spirit and scope of the invention, except as the same may be necessarily limited by the appended claims or reasonable equivalents thereof.

What is claimed is:

1. A base pad for supporting machinery comprising:
   a peripheral frame of interconnected beams defining an interior space completely enclosed within said beams, said peripheral frame being made up of a plurality of interconnected I-beams having a pair of opposed, substantially parallel top and bottom flanges and an interconnecting web portion interconnecting said flanges;
   a cementitious material filling the interior space within said peripheral frame and extending from the top flanges of said interconnected I-beams to the bottom flanges thereof to thereby define the thickness of said cementitious material so that the thickness thereof is substantially the same as the distance between the flanges of said I-beams;
   a plurality of spaced pairs of rigid, flanged beams set into the cementitious material and extending across said frame and defining a plurality of spaced tie down tracks opening downwardly from said upper surface, with each of said tracks communicating with a liquid drainage channel therebelow and defined between the flanged beams in each of said flanged beam pairs, each of said spaced tie down tracks terminating at one of its ends in an enlarged notch for receiving a fastener subassembly to be slidably positioned in the respective tie down track at the end of which said notch is located; and
   a plurality of liquid spouts secured to the outer side of said peripheral frame and opening through the web portion of one of said I-beams so as to communicate with at least one of said liquid drainage channels through the opening through the web portion of one of said interconnected I-beams of said peripheral frame, said liquid spouts being spaced from each other around the outer side of said peripheral frame; and
   a plurality of liquid-receiving V-gutters set into the surface of said cementitious material and extending around said peripheral frame adjacent said interconnected beams, said V-gutters communicating with said liquid drainage channels for draining liquid thereinto.

2. A base pad for supporting machinery comprising:
   a peripheral frame of interconnected beams defining an interior space enclosed within said beams, said peripheral frame being made up of a plurality of interconnected I-beams having a pair of opposed substantially parallel top and bottom flanges and an interconnecting web portion;
   a cementitious material filling the interior space within said peripheral frame and extending from the top flanges of said interconnected I-beams to the bottom flanges thereof to thereby define the thickness of said cementitious material so that the thickness thereof is substantially the same as the distance between the flanges of said I-beams, said cementitious material having an upper surface and a lower surface;
   a plurality of spaced pairs of rigid, flanged beams set into the cementitious material and extending across said frame and defining a plurality of spaced tie down tracks opening downwardly from said upper surface, with each of said tracks communicating with a liquid drainage channel therebelow and defined between the flanged beams in each of said flanged beam pairs, each of said spaced tie down tracks terminating at one of its ends in an enlarged notch for receiving a fastener subassembly to be slidably positioned in the respective tie down track at the end of which said notch is located; and a plurality of liquid spouts secured to the outer side of said peripheral frame and each opening through the web portion of one of said I-beams so as to communicate with at least one o said liquid drainage channels through the opening through the web portion of one of said interconnected I-beams of said peripheral frame, said liquid spouts being spaced from each other around the outer side of said peripheral frame; and a plurality of liquid-receiving, upwardly opening gutters set into the surface of said cementitious material and extending around said peripheral frame for receiving liquids draining by gravitation and vibration across said upper surface of said cementitious material, said gutters communicating with said liquid drainage channels for draining liquid thereinto.

3. A base pad for anchoring heavy vibrating machinery comprising:

a rigid frame including a plurality of interconnected I-beams defining an interior space in which cementitious material can be located, said I-beams each having a pair of spaced flanges interconnected by a web portion, said I-beams each having spaced openings through the web portions thereof;

cementitious material within said frame and having an upwardly facing machinery surface;

liquid removal spouts aligned with said spaced openings through the web portions of the I-beams of said frame, with one of said spouts aligned with, and communicating with, one of said openings;

a plurality of tie down fastener subassemblies movably mounted in said cementitious material and accessible at said upwardly facing surface for securing machinery to said base pad; and liquid drainage means for channeling the flow of liquids falling on the surface of said pad to selected locations thereon, said liquid drainage means comprising upwardly opening gutters set into the upper surface of said cementitious material and positioned to move liquid toward said spouts.

4. A base pad for anchoring heavy vibrating machinery comprising:

a rigid rectangular frame including a plurality of interconnected I-beams defining and enclosing a rectangular interior space, said I-beams each having a pair of spaced flanges interconnected by a web portion, and said I-beams each further having spaced openings through the web portions thereof, said openings placing said interior space in communication with the exterior side of said rigid frame;

cementitious material within said interior space defined and enclosed by said rigid rectangular frame and having an upwardly facing, machinery supporting surface;

liquid removal spouts aligned with said spaced openings through the web portions of the I-beams of said frame, with one of said spouts being aligned with, and communicating with, each one of said openings;

a plurality of tie down fastener subassemblies movably mounted in the cementitious material and accessible in said upwardly facing surface for securing machinery to said base pad; and liquid drainage means for channeling the flow of liquids falling on the surface of said base pad to selected locations thereon adjacent said openings and said liquid removal spouts aligned therewith, said liquid drainage means comprising upwardly opening gutters set in the upper surface of said cementitious material and positioned to move liquid toward said spaced openings in the web portions of said I-beams and said liquid removal spouts aligned with said spaced openings.

5. A base pad for anchoring heavy vibrating machinery comprising:

a rigid rectangular frame including a plurality of interconnected beams defining and enclosing a rectangular interior space, said beams each having a pair of spaced flanges interconnected by a web portion extending between the flanges, said beams each further having spaced openings through the web portions thereof, said openings placing said interior space in communication with the exterior side of said rigid frame;

cementitious material within said interior space defined and enclosed by said rigid rectangular frame and having an upwardly facing, machinery-supporting surface;

a plurality of tie down fastener subassemblies movably mounted in the cementitious material and accessible in said upwardly facing surface for securing machinery to said base pad; and liquid drainage means for channeling the flow of liquids falling on the surface of said base pad to selected locations thereon adjacent said openings, with said selected locations aligned with, and communicating with, said openings to facilitate the drainage of liquids from said selected locations through said openings to the outer side of said rigid frame, said liquid drainage means comprising upwardly opening gutters set in the upper surface of said cementitious material and positioned to move the liquid toward said selected locations aligned with said spaced openings in the web portions of said beams to facilitate drainage of the liquid therethrough.

* * * * *

UNITED STATES PATENT AND TRADEMARK OFFICE
CERTIFICATE OF CORRECTION

PATENT NO. : 5,149,050

DATED : September 22, 1992

INVENTOR(S) : Derrell Smith, et al

It is certified that error appears in the above-identified patent and that said Letters Patent is hereby corrected as shown below:

On the title page, In Item [76] Inventors: change "Aladino Cassar's address from "2449 Glenn Ave." to read —2409 Glen Ave.—

On the title page, Under Foreign Patent Documents change the French Patent Number from "380351" to read —1380351—.

Column 4, line 23 insert between the words "by" and "pair" the word —a—.

Column 9, line 14, delete "o" and insert —of—.

Signed and Sealed this

Ninth Day of November, 1993

Attest:

BRUCE LEHMAN

Attesting Officer

Commissioner of Patents and Trademarks